Oct. 22, 1935.　　　G. LAUGHLIN　　　2,018,452
COLLET
Filed Aug. 3, 1933　　　2 Sheets-Sheet 1
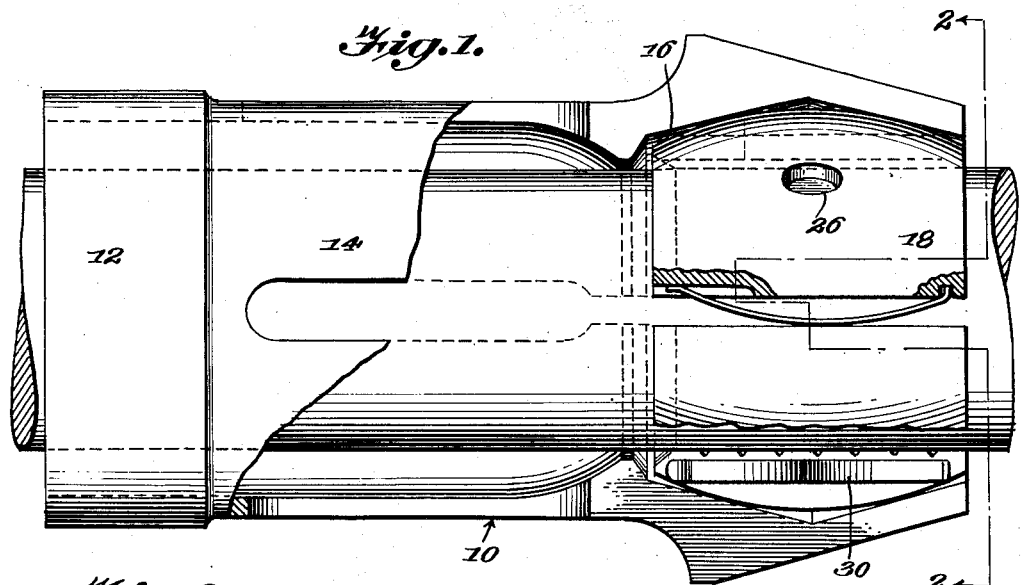
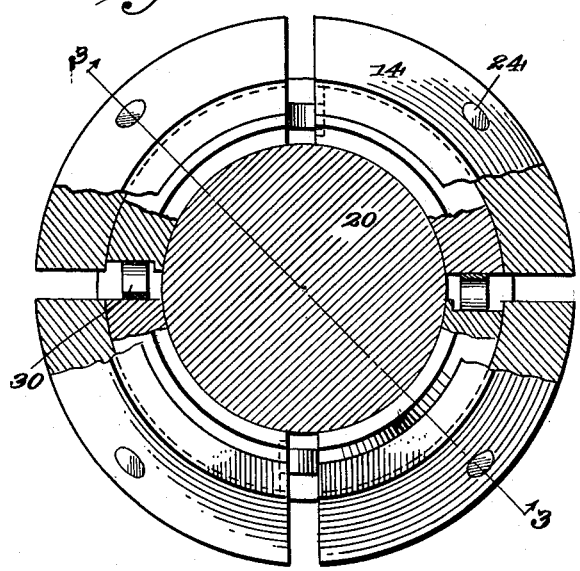
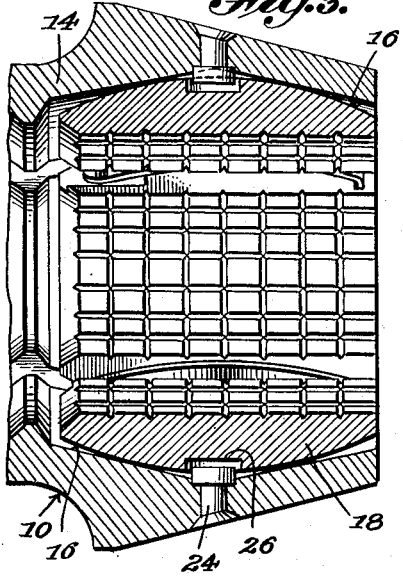
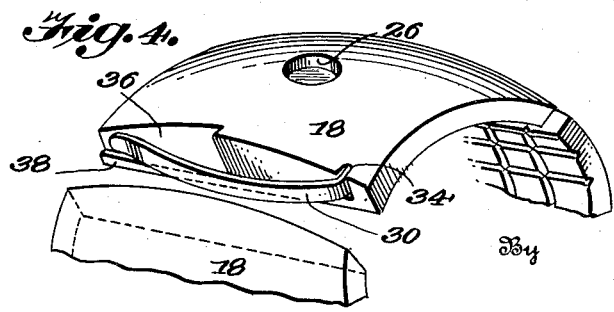
Inventor
GUY LAUGHLIN
By
Attorney Oct. 22, 1935.  G. LAUGHLIN  2,018,452
COLLET
Filed Aug. 3, 1933  2 Sheets-Sheet 2
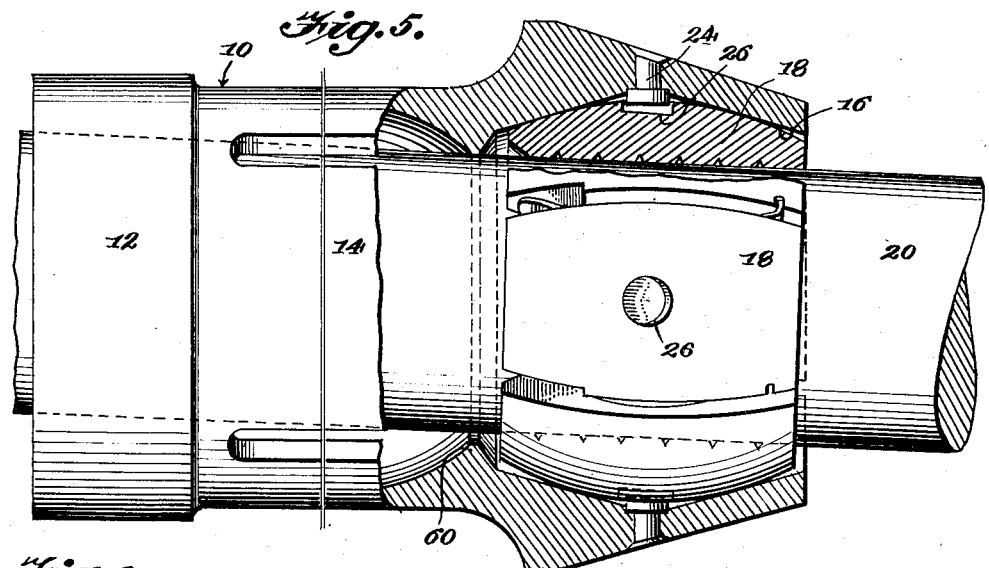
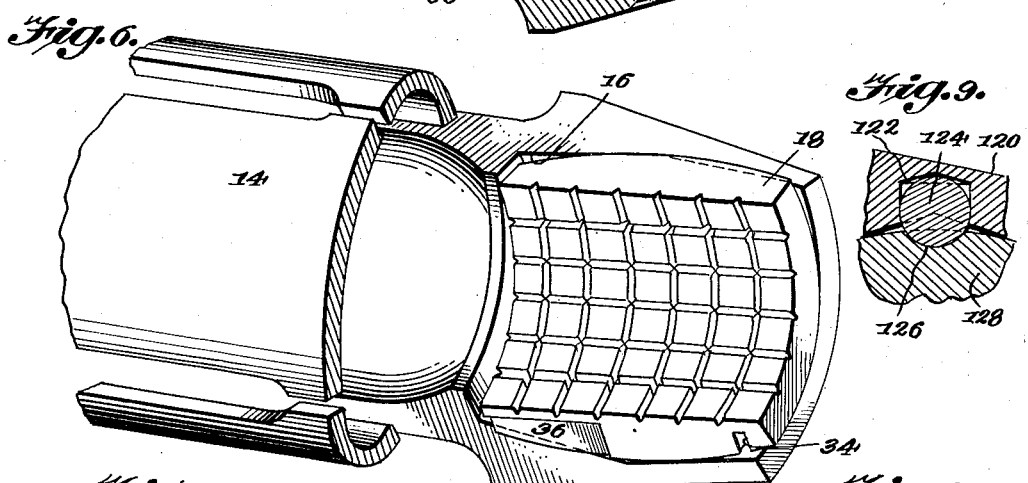
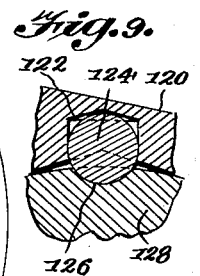
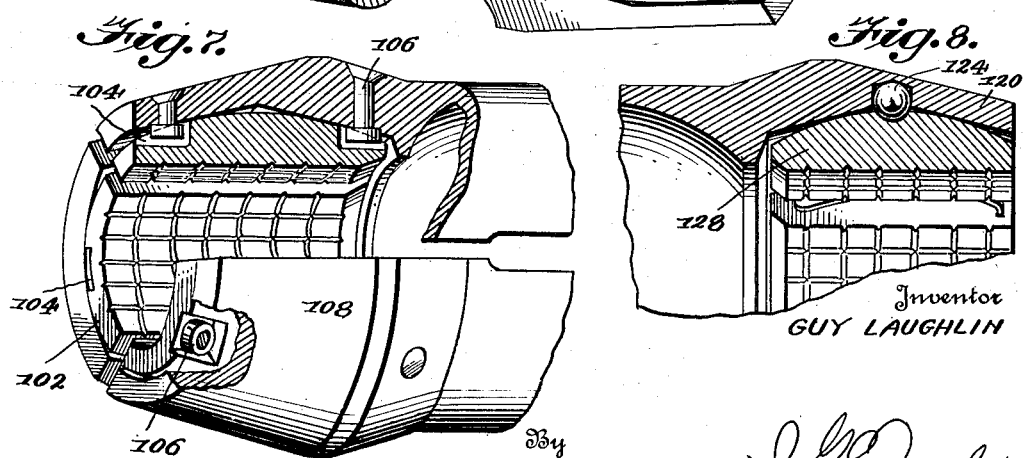
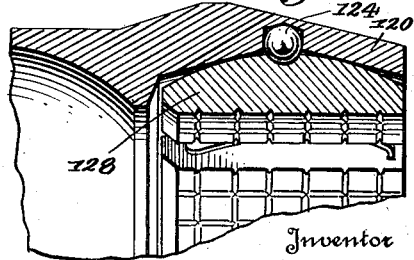
Inventor
GUY LAUGHLIN Patented Oct. 22, 1935

2,018,452

UNITED STATES PATENT OFFICE 2,018,452

COLLET

Guy Laughlin, Birmingham, Mich.

Application August 3, 1933, Serial No. 683,520

10 Claims. (Cl. 279—51)

This invention relates to collets, especially adapted for use in bar forming machines, automatic and hand operated screw machines and other machines in which bars of stock are held in position while being operated on by appropriate tools.

The invention forming the subject of this application will be found to have for one of its principal attributes the provision of means by which the pads of a collet may shift laterally, longitudinally and may turn, within predetermined limits, about the radius of the collet to adapt the pads to irregularities in the stock being handled while maintaining generous contact areas between the pads and fingers regardless of the positions of the pads to the end that the collet is enabled to resist extreme chucking pressures.

Another feature of the invention will be found to reside in the particular spring means by which the pads are held in more or less uniformly spaced relation and allowed to shift individually or in concert to conform to out of round conditions, warpage, distortion, or other irregularities in the stock being handled.

Also, a collet of the type herein disclosed is preferably provided at a point immediately rearward of the pads thereof with a gradually restricted bore by which the stock is centered for passage between the pads without bumping the ends of the pads and possibly dislocating one or more of the pads or springs associated with the pads.

A further and equally important object is to provide a collet chuck of the type suggested which is of highly simplified construction, rugged and cheap to manufacture.

Other objects and advantages will be apparent during the course of the following description.

In the accompanying drawings, forming a part of this application and in which like numerals are employed to designate like parts throughout the same, Figure 1 is a side elevation of the improved collet, partly broken away to illustrate the mounting of the pad, Figure 2 is a vertical transverse sectional view taken on line 2—2 of Figure 1, Figure 3 is a fragmentary longitudinal sectional view taken on line 3—3 of Figure 2, Figure 4 is a fragmentary perspective of a portion of the pads, Figure 5 is a fragmentary side elevation of the improved collet illustrating the manner in which the pads may adapt themselves to irregularities in the stock being handled, the irregularity of the stock being exaggerated, Figure 6 is a fragmentary perspective of the collet illustrating the manner in which the pads may shift with respect to the supporting fingers thereof, Figure 7 is a fragmentary sectional perspective illustrating a modification of the invention, Figure 8 is a detail longitudinal sectional view illustrating another expression of the invention, Figure 9 is a detail sectional view illustrating the particular connection between the pads and the surrounding fingers.

In the drawings, the numeral 10 designates a body of tubular form having a plurality of longitudinally spaced more or less parallel slots opening out through the forward end thereof and terminating short of the attaching portion 12 to form transversely curved fingers 14.

As shown in Figure 5, the forward portions of the fingers have the inner surfaces thereof angled outward toward points between the ends thereof to define meeting bearing faces 16 disposed at acute angles to the radius of the body and to the longitudinal axis thereof.

More specifically, the angularly disposed bearing faces 16 are straight from end to end and are, of course, curved transversely for contact by the pads 18.

In carrying out the invention, the pads 18 have spherical perimeters engaging the two separate bearing faces of each of the fingers at points between the ends thereof rendering the pads shiftable with the result that the pads may adapt themselves to irregularities in the bar of stock 20.

That is to say, if the bar 20 is slightly out of round, is warped, or is otherwise distorted, the pads 18 may shift independently or in concert for the accommodation of the bar.

In addition to being shiftable longitudinally and transversely, within certain limits, of course, the pads may turn about the respective radii thereof, it being observed in this connection that pins 24 are mounted radially in the fingers at the meeting portions of the bearing faces 16 and have diametrically enlarged inner ends loosely received within blind openings or sockets 26 in the outer surfaces of the pads. The fact that the diametrically enlarged inner ends of the pins 24 are freely received within the blind openings 26 allows a limited predetermined shifting, both longitudinally and laterally, of the pads with respect to the fingers permitting the pads to adapt themselves individually and collectively to irregularities in the stock being handled.

As previously suggested, the pins 24 provide for turning or swivelling of the pads about the respective radii thereof, this being apparent from an inspection of Figure 5. However, it should be observed that the pin and socket connections between the fingers and the pads limit the extent to which the pads may shift longitudinally and transversely with respect to the surrounding fingers.

Referring now to Figures 1, 3 and 4 it will be seen that the several pads are held in more or less uniformly spaced relation by longitudinally curved leaf springs 30, the forward portions of which are extended laterally to form bills or attaching elements snugly received in transverse notches 34 in the edges of the pads. The leaf springs 30 are also shown to be provided with free terminal portions loosely extended into shallow recesses 36 in the rear portions of the pads and movable longitudinally in such recesses so as to allow of flexing of the springs as an incident to the shifting of the pads with respect to each other.

It is clearly shown in Figure 4 that the recesses 36 open out through the outer surfaces of the pads and terminate short of the inner surfaces of the pads so that there are formed, in effect, a plurality of longitudinally extending ribs 38 guarding against the slipping or other movement of the leaf springs 32 into the bore of the collet. Of course, it is inconsequential that the recess 36 open out through the outer surfaces of the pads because the angularly extending bearing surfaces 16 limit outward movement of the springs.

The intermediate portions of the longitudinally curved leaf springs 30 bear against the opposed plain edges of the pads and in this manner, the pads are subjected to uniform spring pressure by which substantially uniform spaces are maintained between the pads.

With reference to the foregoing, it will be seen that the pads are yieldingly mounted within the bore of the collet in a manner which allows the same to shift longitudinally or transversely or to swivel about the pivot elements thereof to the extent required to adapt the pads to such inequalities as may be encountered in the stock. The loose pivotal connection between the pads and the pins associated therewith allows for a loose turning of the pads and at the same time holds the pads against more than a very small longitudinal movement, which allowed small movement of the pads is sufficient to adapt the pads to inequalities in the bar of stock.

As illustrated in Figure 5, the tubular body 10 is provided at a point immediately rearward of the pads 18 with an internal rib 60 having the rear face thereof curved inward to provide a centering means for engagement with the stock 20 so as to guide the stock to a central position for passage between the pads. In this manner the stock is prevented from bumping the rear ends of the pads and possibly dislocating the same or the springs associated therewith. In this connection it might be noted that the rear ends of the pads are beveled or chamfered to provide inclined surfaces by which the stock is further guided between the pads.

To insert the pads it is a simple matter to spread the fingers and to slip the pads in place and to then mount the longitudinally curved springs between the spaced edges of the pads. By the same token, when it is desired to remove the pads for substitution by others of the same or a different size or bore, the fingers are spread and the various pads are slipped out individually.

Of course, as in the case of other collets, the pads may be made of one degree of hardness while the surrounding fingers are made of another degree of hardness and with the required flexibility by heat treatment or otherwise.

In the form of invention illustrated in Figure 7, the pads 102 are provided with longitudinal notches or grooves 104 opening out through the ends of the pads and freely receiving pins 106. The pins 106 are shown to be radially mounted in the fingers 108 and have the inner portions thereof terminating in diametrical enlargements freely received within the grooves 104, so as to limit movement of the pads and at the same time to provide a simple means by which the pads may be mounted.

The length of each groove 104 is such as to allow a limited longitudinal movement of the pads and the width of each groove is such as to allow a limited transverse shifting or a swivelling of the pads to adapt the pads to irregularities in the stock being handled.

It will be seen that the distance between the longitudinally aligned pins is slightly greater than the inner end walls of the groove 104, so as to permit of a limited longitudinal shifting of the pads.

It is believed to be clear that the mounting of the pads as shown in Figure 7, provides for the easy insertion and removal of the pads and at the same time holds the pads against accidental displacement.

In the form of invention illustrated in Figures 8 and 9 the fingers 120 of the collet chuck are provided between the longitudinal edges thereof with radial sockets 122 receiving balls 124, the balls being peened or otherwise held in place.

Portions of the balls 124 extend beyond the inner surfaces of the fingers 120 and are seated in rather shallow sockets 126 in the pads 128 allowing limited shifting or swiveling of the pads with respect to the surrounding fingers with the result that the pads may adapt themselves to irregularities in the stock being handled.

In summarizing, it might be said that the improved collet embodies a plurality of transversely curved fingers having internal circumferentially extending grooves substantially V-shaped in cross-section to define converging contact surfaces tangential to the convex or spherical perimeters of the pads and engaging such pads at longitudinally spaced points, producing generous contact areas between the pads and the fingers so that the collet is enabled to withstand extreme chucking pressures particularly on stock found to be irregular in shape. More specifically, the pads are instantly shiftable to a variety of positions so that the pads adapt themselves to irregularities in the stock being handled and in all operative positions of the pads there are generous longitudinally spaced contact areas between the pads and the surrounding fingers. It is through the provision of such longitudinally spaced generous contact areas between the pads and the surrounding fingers and the adaptability of the pads to irregularities in the stock being handled, that the collet is enabled to resist extreme chucking pressures encountered, especially when the machine is operating at full capacity.

The spaced contact areas between the pads and the surrounding fingers and the strong spring pressure contact between the pads and the fingers provides a means by which chips and the like are prevented from disturbing the pads in the occupancy of their intended positions, one with respect to the other, with the result that the pads are enabled to have uniform pressure contact with the stock being handled.

Having thus described the invention what is claimed is:—

1. In a collet, a body having a plurality of fingers provided with bearing surfaces straight from end to end and angled outward toward the meeting portions thereof, and pads having spherical perimeters engaging at longitudinally spaced points the said bearing surfaces of the fingers, there being a loose fitting pin and socket connection between the fingers and the pads allowing longitudinal and transverse shifting of the pads and turning of the pads about the axis of the pins.

2. In a collet, a plurality of fingers, pads surrounded by the fingers and having edges provided with notches and with recesses, and longitudinally curved leaf springs having laterally projecting end portions in said notches and having free end portions in said recesses.

3. In a collet, a plurality of fingers, pads surrounded by the fingers and having edges provided with notches and with recesses, and longitudinally curved leaf springs having laterally projecting end portions in said notches and having free end portions in said recesses, said recesses being spaced from the inner faces of the pads to define ribs spacing the springs from the inner surfaces of the pads.

4. In a collet, a tubular body having a plurality of spring fingers, pads surrounded by the fingers and having spherical perimeters, the portions of the fingers outward of the pads being provided with dual bearing faces angled outward toward adjacent portions thereof and bearing at longitudinally spaced points against the spherical perimeters of the pads, radial pins carried by the fingers at the meeting portions of said bearing faces, said pads being provided with sockets loosely receiving portions of said pins allowing a predetermined longitudinal and transverse movement of the pads with respect to the surrounding fingers and allowing turning of the pads about the axes of the fingers.

5. In a collet, a tubular body having a plurality of fingers, pads surrounded by the fingers and having spherical perimeters, the portions of the fingers outward of the pads being provided with longitudinally spaced dual bearing faces tangential to and bearing at longitudinally spaced joints against the spherical perimeters of the pads, pins carried by the fingers, said pads being provided with sockets loosely receiving portions of said pins allowing a predetermined movement of the pads with respect to the surrounding fingers and allowing turning of the pads about the axes of the fingers, and spring means uniformly separating the pads.

6. In a collet, a tubular body having a plurality of fingers, pads surrounded by said fingers, one of said pads being formed with spaced grooves, and pins carried by one of said fingers and received in said grooves the distance between the pins being greater than the distance between the grooves thereby allowing shifting of that pad with respect to the adjacent finger.

7. In a collet, a tubular body having a plurality of fingers, pads surrounded by said fingers, one of said pads being formed with longitudinally spaced grooves, and longitudinally spaced pins carried by one of said fingers and received in said grooves, the distance between the pins being greater than the distance between the grooves thereby allowing longitudinal shifting of that pad with respect to the adjacent finger.

8. In a collet, a tubular body having a plurality of fingers, pads surrounded by said fingers, one of said pads being formed with longitudinally spaced grooves, and longitudinally spaced pins carried by one of said fingers and received in said groove, the distance between the pins being greater than the distance between the grooves thereby allowing longitudinal shifting of that pad with respect to the adjacent finger, each pad and the adjacent finger having opposed complemental contact surfaces with one of said surfaces at a tangent to the complemental surface thereof.

9. In a stock engaging collet for use in bar forming machines, a plurality of separate arcuate stock engaging pads arranged in substantially circular form for intermittent gripping engagement with the stock being handled and having spherical perimeters, and a stock receiving body of tubular form having transversely curved fingers surrounding said pads and having converging bearing surfaces tangential to and in contact with the perimeters of the pads at longitudinally spaced points between the ends thereof to provide for individual turning and endwise shifting of each pad irrespective of the turning and shifting of the other pads to adapt the pads to irregularities in the stock being handled.

10. In a stock engaging collet for use in bar forming machines, a plurality of separate arcuate stock engaging pads arranged in substantially cylindrical form for intermittent gripping engagement with the stock being handled, and a stock receiving body of tubular form having transversely curved fingers surrounding said pads, each pad and the adjacent finger having opposed complemental contact surfaces, one of each of such complemental contact surfaces being at a tangent and in contact with the complemental surface between the ends thereof to provide for independent and individual turning and shifting of each pad about the radius of said tubular body irrespective of the turning and shifting of the other pads to adapt the pads to irregularities in the stock embraced thereby.

GUY LAUGHLIN.